US010976482B2

(12) United States Patent
Miyao (10) Patent No.: US 10,976,482 B2
(45) Date of Patent: Apr. 13, 2021

(54) DISPLAY DEVICE, LIGHT-EMITTING MODULE AND ELECTRONIC COMPONENT

(71) Applicant: Japan Display Inc., Tokyo (JP)

(72) Inventor: Makoto Miyao, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/826,317

(22) Filed: Mar. 23, 2020

(65) Prior Publication Data

US 2020/0326466 A1 Oct. 15, 2020

(30) Foreign Application Priority Data

Apr. 15, 2019 (JP) .............................. JP2019-077168

(51) Int. Cl.
*G02F 1/1334* (2006.01)
*F21V 8/00* (2006.01)

(52) U.S. Cl.
CPC ......... *G02B 6/0055* (2013.01); *G02B 6/0083* (2013.01); *G02F 1/1334* (2013.01)

(58) Field of Classification Search
None
See application file for complete search history.

(56) References Cited

U.S. PATENT DOCUMENTS

| 2009/0009689 | A1* | 1/2009 | Okuwaki | G02B 6/0031 349/65 |
| 2010/0085510 | A1 | 4/2010 | Okuyama et al. | |
| 2013/0044511 | A1* | 2/2013 | Motooka | G02B 6/0053 362/606 |
| 2016/0070047 | A1 | 3/2016 | Okuyama et al. | |
| 2018/0031758 | A1* | 2/2018 | Mizuno | G02B 6/0055 |

FOREIGN PATENT DOCUMENTS

| JP | 2010-92682 A | 4/2010 |
| JP | 2016-57338 A | 4/2016 |

\* cited by examiner

*Primary Examiner* — James A Dudek
(74) *Attorney, Agent, or Firm* — Xsensus LLP (57) ABSTRACT

According to one embodiment, a display device includes a display panel including a polymer dispersed liquid crystal layer, and a light-emitting module disposed along a side surface of the display panel. The light-emitting module includes a light-emitting element, a light guide disposed between the light-emitting element and the side surface, and a reflector. The light guide has a first surface and a second surface facing each other, a third surface facing the light-emitting element, and a fourth surface facing the side surface. The reflector is disposed on each of the first surface and the second surface.

11 Claims, 8 Drawing Sheets

DISPLAY DEVICE, LIGHT-EMITTING MODULE AND ELECTRONIC COMPONENT

CROSS-REFERENCE TO RELATED APPLICATIONS

This application is based upon and claims the benefit of priority from Japanese Patent Application No. 2019-077168, filed Apr. 15, 2019, the entire contents of which are incorporated herein by reference.

FIELD

Embodiments described herein relate generally to a display device, a light-emitting module and an electronic component.

BACKGROUND

Recently, various illumination devices including light-modulating elements which exhibit scattering properties or transparent properties with respect to light have been proposed. For example, the light-modulating element includes a polymer dispersed liquid crystal layer as a light-modulating layer. The light-modulating element is disposed behind a light guide plate and scatters light which enters from a side surface of the light guide plate.

Light emitted from a plurality of light-emitting elements arranged at intervals propagate through the light guide plate while being diffused in the light guide plate. In a region of the light guide plate in the vicinity of the light-emitting elements, the light from the light-emitting elements is not sufficiently mixed together in some cases. In such cases, difference in luminance may become visible as stripe-shaped irregularities.

DETAILED DESCRIPTION

In general, according to one embodiment, there is provided a display device including a display panel which includes a polymer dispersed liquid crystal layer and a light-emitting module which is disposed along a side surface of the display panel. The light-emitting module includes a light-emitting element, a light guide disposed between the light-emitting element and the side surface, and a reflector. The light guide has a first surface and a second surface facing each other, a third surface facing the light-emitting element, and a fourth surface facing the side surface. The reflector is disposed on each of the first surface and the second surface.

According to another embodiment, there is provided a light-emitting module including a light-emitting element, a light guide which has a first surface and a second surface facing each other and a third surface facing the light-emitting element, and a reflector which is disposed on each of the first surface and the second surface.

According to yet another embodiment, there is provided an electronic component including a wiring substrate, a reflector which has a first portion and a second portion facing each other across a space, and an adhesive layer which bonds the wiring substrate and the reflector together.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, structural elements which function in the same or a similar manner to those described in connection with preceding drawings are denoted by the same reference numbers, and detailed explanations of them that are considered redundant may be arbitrarily omitted.

Figure 1:
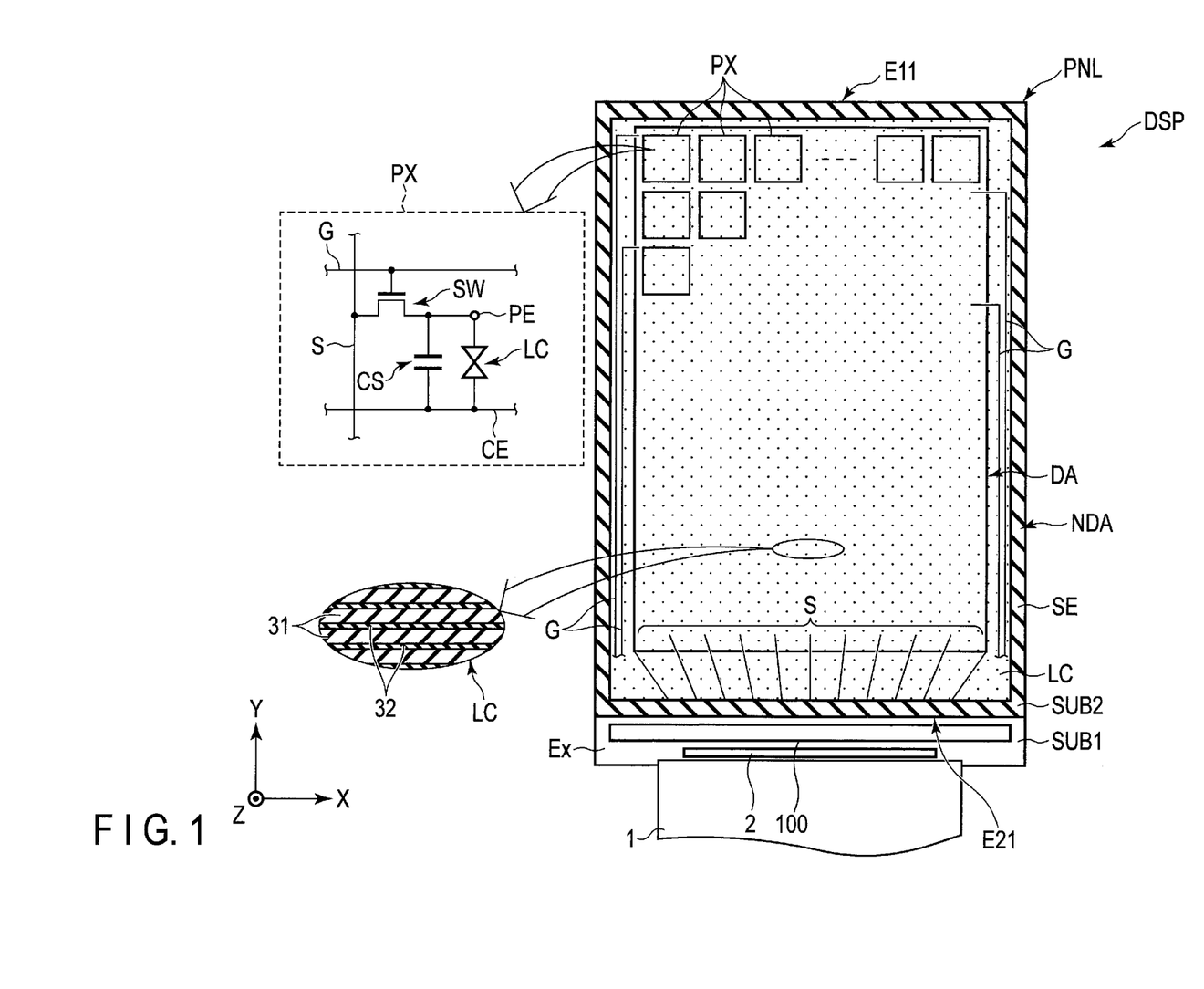
FIG. 1 is a plan view showing a configuration example of a display device DSP of the present embodiment.

FIG. 1 is a plan view showing a configuration example of a display device DSP of the present embodiment. A first direction X, a second direction Y and a third direction Z are, for example, orthogonal to one another but may cross one another at an angle other than 90 degrees. The first direction X and the second direction Y correspond to directions parallel to a main surface of a substrate constituting the display device DSP, and the third direction Z corresponds to a thickness direction of the display device DSP. In the present embodiment, a view of an X-Y plane defined by the first direction X and the second direction Y will be referred to as planar view.

The display device DSP includes a display panel PNL including a polymer dispersed liquid crystal layer (hereinafter referred to simply as a liquid crystal layer LC), a wiring substrate 1, an IC chip 2 and a light-emitting module 100.

The display panel PNL includes a first substrate SUB1, a second substrate SUB2, the liquid crystal layer LC and a sealant SE. The first substrate SUB1 and the second substrate SUB2 overlap in planar view. The first substrate SUB1 and the second substrate SUB2 are bonded together by the sealant SE. The liquid crystal layer LC is held between the first substrate SUB1 and the second substrate SUB2 and is sealed by the sealant SE.

As shown in an enlarged schematic view within FIG. 1, the liquid crystal layer LC includes a polymer 31 and liquid crystal molecules 32. The polymer 31 is, for example, a liquid crystal polymer. The polymer 31 is formed into stripes extending in the first direction X and is arranged in the second direction Y. The liquid crystal molecules 32 are dispersed in gaps of the polymer 31 and are aligned such that major axes of them are aligned in the first direction X. Each of the polymer 31 and the liquid crystal molecule 32 has optical anisotropy or refractive anisotropy. The responsiveness to an electric field of the polymer 31 is lower than the responsiveness to an electric field of the liquid crystal molecule 32.

For example, the alignment direction of the polymer 31 hardly changes regardless of the presence or absence of an electric field. On the other hand, the alignment direction of the liquid crystal molecule 32 changes in accordance with an electric field in a state where a high voltage of greater than or equal to a threshold value is applied to the liquid crystal layer LC. In a state where voltage is not applied to the liquid crystal layer LC, the optical axis of the polymer 31 and the optical axis of the liquid crystal molecule 32 are parallel to each other, and light which enters the liquid crystal layer LC is transmitted through the liquid crystal layer LC and is hardly scattered in the liquid crystal layer LC (transparent state). In a state where voltage is applied to the liquid crystal layer LC, the optical axis of the polymer 31 and the optical axis of the liquid crystal molecule 32 cross each other, and light which enters the liquid crystal layer LC is scattered in the liquid crystal layer LC (scattering state).

The display panel PNL includes a display portion DA in which an image is displayed and a frame-shaped non-display portion NDA which surrounds the display portion DA. The sealant SE is located in the non-display portion NDA. The display portion DA includes pixels PX arrayed in a matrix in the first direction X and the second direction Y.

As shown in an enlarged view within FIG. 1, each pixel PX includes a switching element SW, a pixel electrode PE, a common electrode CE, the liquid crystal layer LC and the like. The switching element SW is composed of, for example, a thin-film transistor (TFT) and is electrically connected to a scanning line G and a signal line S. The scanning line G is electrically connected to the switching elements SW in the respective pixels PX arranged in the first direction X. The signal line S is electrically connected to the switching elements SW in the respective pixels PX arranged in the second direction Y. The pixel electrode PE is electrically connected to the switching element SW. The common electrode CE is an electrode common to the pixel electrodes PE. The liquid crystal layer LC (in particular, the liquid crystal molecules 32) is driven by an electric field produced between the pixel electrode PE and the common electrode CE. A capacitance CS is formed between, for example, an electrode having the same potential as the common electrode CE and an electrode having the same potential as the pixel electrode PE.

As will be described later, the scanning line G, the signal line S, the switching element SW and the pixel electrode PE are disposed in the first substrate SUB1, and the common electrode CE is disposed in the second substrate SUB2. In the first substrate SUB1, the scanning line G and the signal line S are electrically connected to the wiring substrate 1 or the IC chip 2.

The wiring substrate 1 and the IC chip 2 are mounted on an extension portion Ex of the first substrate SUB1. The extension portion Ex corresponds to a portion of the first substrate SUB1 which does not overlap the second substrate SUB2. The wiring substrate 1 is, for example, a bendable flexible printed circuit. For example, a display driver which outputs a signal necessary for image display or the like is incorporated in the IC chip 2. Note that the IC chip 2 may be mounted on the wiring substrate 1.

Although the details of the light-emitting module 100 will be described later, the light-emitting module 100 is disposed along a side surface (or end portion) of the display panel PNL and emits light toward the side surface. The side surface of the display panel PNL in the present embodiment may correspond to either one of a side surface of the first substrate SUB1 and a side surface of the second substrate SUB2 or may correspond to both of a side surface of the first substrate SUB1 and a side surface of the second substrate SUB2.

In the example shown in FIG. 1, the light-emitting module 100 overlaps the extension portion Ex in planar view and a side surface E21 of the second substrate SUB2 corresponds to the side surface of the display panel PNL. However, the light-emitting module 100 may be disposed along another side surface of the display panel PNL and may be disposed along, for example, a side surface E11 on the opposite side to the side surface E21. On the opposite side to the side surface E21, the first substrate SUB1 and the second substrate SUB2 overlap each other. That is, the side surface E11 includes a side surface of the first substrate SUB1 and a side surface of the second substrate SUB2. In this case, the light-emitting module 100 may emit light toward either one of the side surface of the first substrate SUB1 and the side surface of the second substrate SUB2 or may emit light toward both of the side surface of the first substrate SUB1 and the side surface of the second substrate SUB2.

Figure 2:
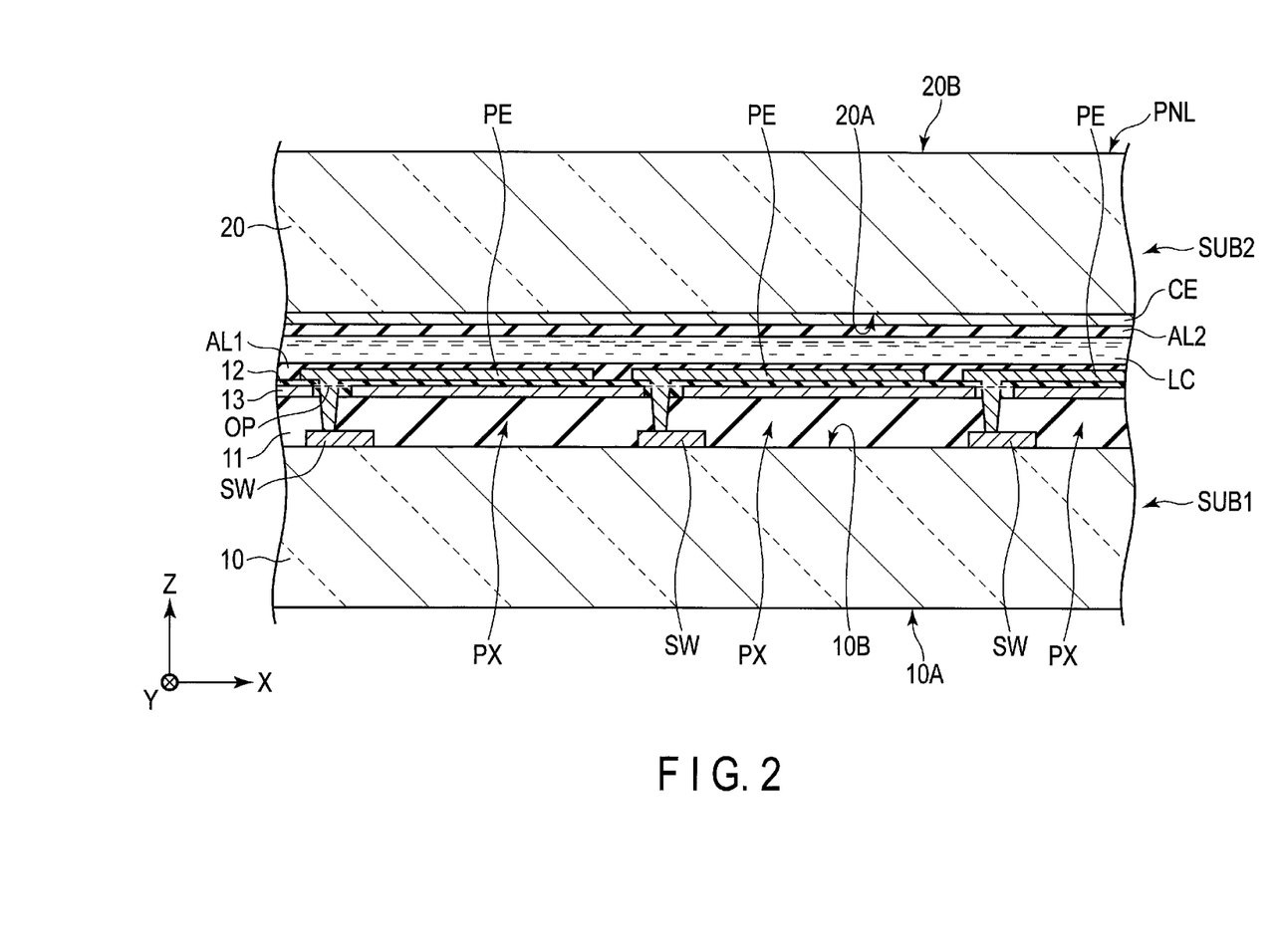
FIG. 2 is a cross-sectional view showing a configuration example of a display panel PNL shown in FIG. 1.

FIG. 2 is a cross-sectional view showing a configuration example of the display panel PNL shown in FIG. 1.

The first substrate SUB1 includes a transparent substrate 10, insulating films 11 and 12, a capacitance electrode 13, the switching element SW, the pixel electrode PE and an alignment film AL1. The transparent substrate 10 has a main surface (outer surface) 10A and a main surface (inner surface) 10B on the opposite side to the main surface 10A. The switching element SW is disposed on the main surface 10B side. The insulating film 11 is disposed on the main surface 10B and covers the switching element SW. Although the scanning line G and the signal line S shown in FIG. 1 are disposed between the transparent substrate 10 and the insulating film 11, the illustrations of them are omitted here. The capacitance electrode 13 is disposed between the insulating films 11 and 12. The pixel electrode PE is disposed for each pixel PX between the insulating film 12 and the alignment film AL1. That is, the capacitance electrode 13 is disposed between the transparent substrate 10 and the pixel electrode PE. The pixel electrode PE is electrically connected to the switching element SW via an opening OP of the capacitance electrode 13. The pixel electrode PE overlaps the capacitance electrode 13 via the insulating film 12 and forms the capacitance CS of the pixel PX. The alignment film AL1 covers the pixel electrode PE. The alignment film AL1 is in contact with the liquid crystal layer LC.

The second substrate SUB2 includes a transparent substrate 20, the common electrode CE and an alignment film AL2. The transparent substrate 20 has a main surface (inner surface) 20A and a main surface (outer surface) 20B on the opposite side to the main surface 20A. The main surface 20A of the transparent substrate 20 faces the main surface 10B of the transparent substrate 10. The common electrode CE is disposed on the main surface 20A. The alignment film AL2 covers the common electrode CE. The alignment film AL2 is in contact with the liquid crystal layer LC. In the second substrate SUB2, a light-shielding layer may be disposed directly above each of the switching element SW, the scanning line G and the signal line S. In addition, a transparent insulating film may be disposed between the transparent substrate 20 and the common electrode CE or between the common electrode CE and the alignment film AL2. The common electrode CE is disposed over the pixels PX and faces the pixel electrodes PE in the third direction Z. In addition, the common electrode CE is electrically connected to the capacitance electrode 13 and has the same potential as the capacitance electrode 13.

The liquid crystal layer LC is located between the pixel electrode PE and the common electrode CE.

Each of the transparent substrates 10 and 20 is, for example, a glass substrate but may be an insulating substrate such as a plastic substrate. The insulating film 11 includes, for example, a transparent inorganic insulating film of silicon oxide, silicon nitride, silicon oxynitride or the like and a transparent organic insulating film of acrylic resin or the like. The insulating film 12 is a transparent inorganic insulating film of silicon nitride or the like. Each of the capacitance electrode 13, the pixel electrode PE and the common electrode CE is a transparent electrode formed of a transparent conductive material such as indium tin oxide (ITO) or indium zinc oxide (IZO). Each of the alignment films AL1 and AL2 is a horizontal alignment film having an alignment restriction force substantially parallel to the X-Y plane. For example, the alignment films AL1 and AL2 are subjected to alignment treatment in the first direction X. Note that the alignment treatment may be rubbing treatment or may be photoalignment treatment.

Figure 3:
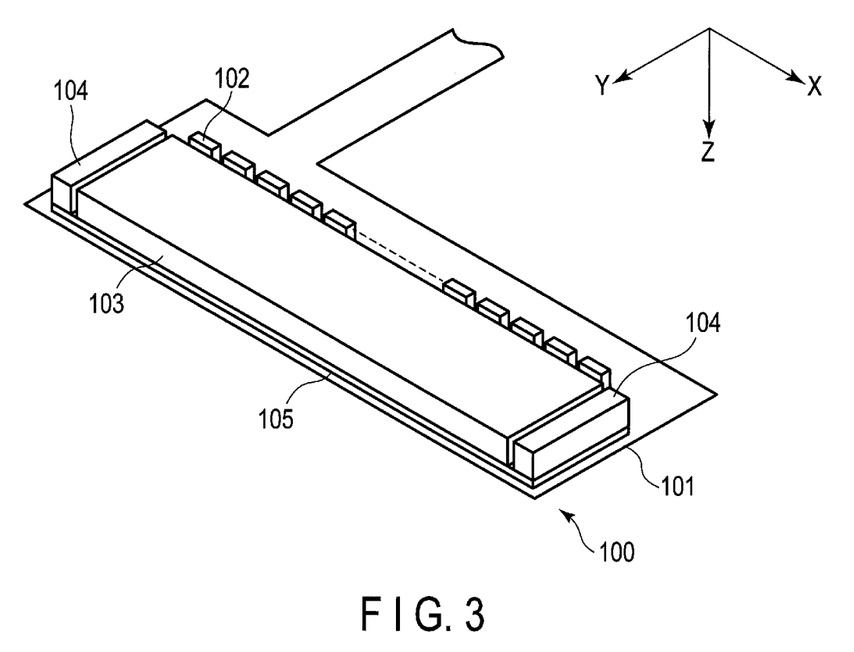
FIG. 3 is a perspective view showing a configuration example of a light-emitting module 100 shown in FIG. 1.

FIG. 3 is a perspective view showing a configuration example of the light-emitting module 100 shown in FIG. 1. The light-emitting module 100 includes a wiring substrate 101, a plurality of light-emitting elements 102, a light guide 103, a reflector 104 and an adhesive layer 105.

The light-emitting elements 102 are arranged at intervals in the first direction X and are electrically connected to the wiring substrate 101. Each light-emitting element 102 is, for example, a light-emitting diode, and although not described in detail, each light-emitting element 102 includes a red light-emitting portion, a green light-emitting portion and a blue light-emitting portion. The light guide 103 is formed into, for example, a transparent flat plate and extends in the first direction X. The light guide 103 is bonded to the wiring substrate 101 by the adhesive layer 105.

Two reflectors 104 are disposed so as to face each other across a space in the first direction X. Each reflector 104 is formed of, for example, a white material (resin material), a metal material or the like. The light guide 103 is disposed between two reflectors 104. In the example shown in FIG. 3, together with the light guide 103, the reflectors 104 are bonded to the wiring substrate 101 by the adhesive layer 105. Each reflector 104 may be in contact with the light guide 103 or may be separated from the light guide 103 (that is, an air layer may be interposed between the light guide 103 and the reflector 104). Note that each reflector 104 may be integrally formed with the light guide 103, may be a film formed on the light guide 103 by various methods such as coating, vapor-deposition and printing, or may be a film bonded to the light guide 103.

Figure 4:
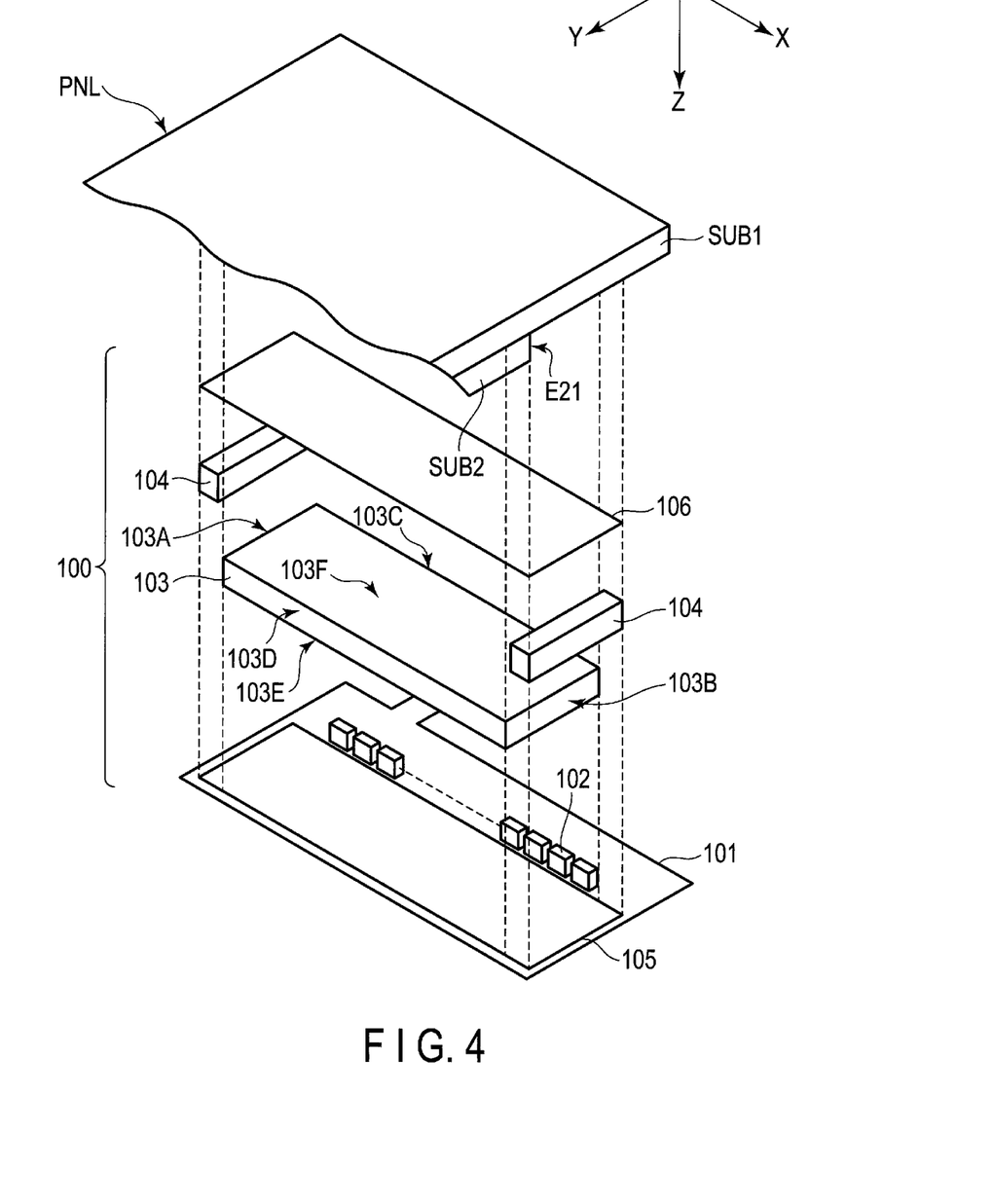
FIG. 4 is an exploded perspective view including the light-emitting module 100 shown in FIG. 3.

FIG. 4 is an exploded perspective view including the light-emitting module 100 shown in FIG. 3. The light guide 103 has a first surface 103A and a second surface 103B which face each other in the first direction X, a third surface 103C and a fourth surface 103D which face each other in the second direction Y, and a fifth surface 103E and a sixth surface 103F which face each other in the third direction Z. The light guide 103 is formed into a substantially rectangular parallelepiped. The area of the first surface 103A and the area of the second surface 103B are substantially the same, the area of the third surface 103C and the area of the fourth surface 103D are substantially the same, and the area of the fifth surface 103E and the area of the sixth surface 103F are substantially the same. Each of the area of the first surface 103A and the area of the second surface 103B is smaller than the area of the third surface 103C. In addition, each of the area of the fifth surface 103E and the area of the sixth surface 103F is larger than the area of the third surface 103C. The light guide 103 and the reflectors 104 are bonded to the wiring substrate 101 by the adhesive layer 105 and are bonded to the first substrate SUB1 of the display panel PNL by an adhesive layer 106.

The light guide 103 is arranged such that the fifth surface 103E faces the wiring substrate 101 and the sixth surface 103F faces the first substrate SUB1. The fifth surface 103E is bonded to the wiring substrate 101 by the adhesive layer 105, and the sixth surface 103F is bonded to the first substrate SUB1 by the adhesive layer 106.

In a state where the light-emitting module 100 is bonded to the first substrate SUB1, the reflectors 104 are disposed on the first surface 103A and the second surface 103B, respectively. In addition, the third surface 103C faces the light-emitting elements 102, and the fourth surface 103D faces the side surface E21 of the second substrate SUB2 corresponding to the side surface of the display panel PNL. Each light-emitting element 102 emits light toward the third surface 103C. That is, the third surface 103C corresponds to a light entrance portion from which the light from each light-emitting element 102 enters. The light which enters the light guide 103 is emitted from the fourth surface 103D toward the display panel PNL.

Figure 5:
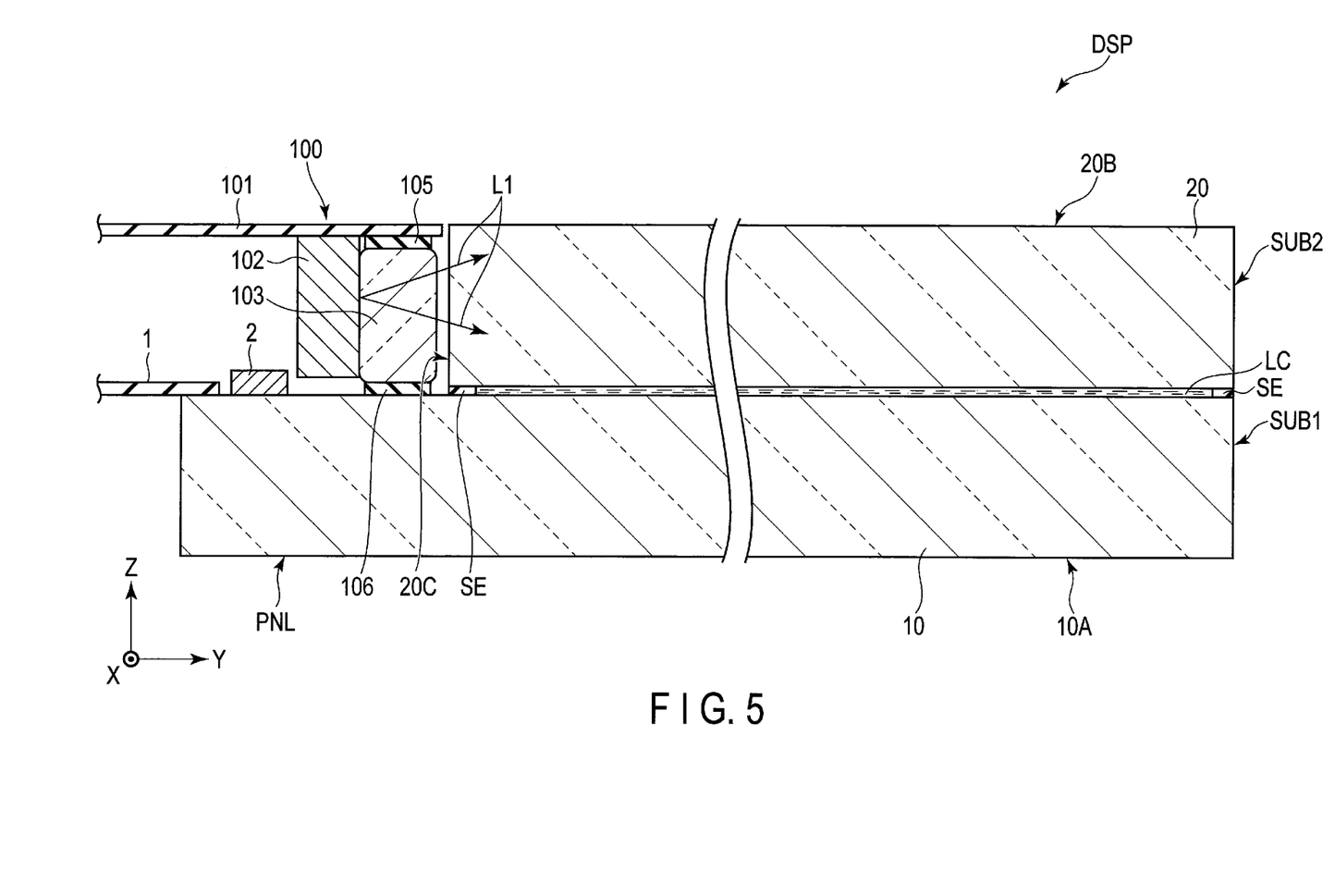
FIG. 5 is a cross-sectional view of the display device DSP including the light-emitting module 100.

FIG. 5 is a cross-sectional view of the display device DSP including the light-emitting module 100. With regard to the display panel PNL, only its main parts are roughly illustrated.

The transparent substrate 20 has a side surface 20C. The side surface E21 of the second substrate SUB2 shown in FIG. 1, etc., includes the side surface 20C. The light-emitting element 102 and the light guide 103 are disposed between the first substrate SUB1 and the wiring substrate 101 in the third direction Z. The light guide 103 is disposed between the light-emitting element 102 and the side surface 20C in the second direction Y. The light guide 103 is bonded to the wiring substrate 101 by the adhesive layer 105 and is bonded to the first substrate SUB1 by the adhesive layer 106.

Next, light L1 emitted from the light-emitting element 102 will be described with reference to FIG. 5.

The light-emitting element 102 emits light L1 toward the light guide 103. The light L1 emitted from the light-emitting element 102 propagates in the direction of an arrow indicating the second direction Y, passes through the light guide 103 and enters the transparent substrate 20 from the side surface 20C. The light L1 which enters the transparent substrate 20 propagates through the display panel PNL while being repeatedly reflected. In a case where the light L1 enters the liquid crystal layer LC to which voltage is not applied, the light L1 is transmitted through the liquid crystal layer LC and is hardly scattered in the liquid crystal layer LC. In a case where the light L1 enters the liquid crystal layer LC to which voltage is applied, the light L1 is scattered in the liquid crystal layer LC. The display device DSP can be observed from the main surface 10A side and can also be observed from the main surface 20B side. In addition, regardless of whether the display device DSP is observed from the main surface 10A side or the display device DSP is observed from the main surface 20B side, the background of the display device DSP can be observed via the display device DSP.

Note that another transparent substrate may be bonded to the main surface 20B of the transparent substrate 20. In this case, not only the side surface 20C of the transparent substrate 20 but also a side surface of the other transparent substrate faces the light-emitting module 100. The light L1 emitted from the light-emitting element 102 enters the transparent substrate 20 and the other transparent substrate, propagates through the display panel PNL, and contributes to display.

Figure 6:
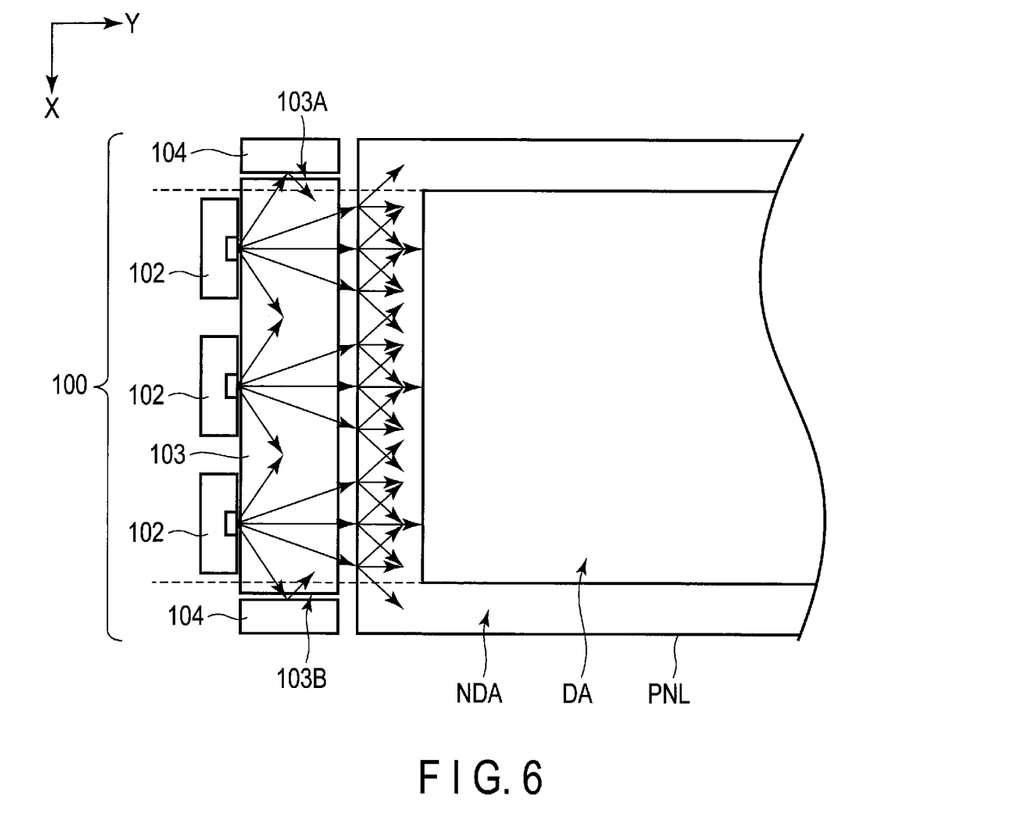
FIG. 6 is a plan view showing how light emitted from light-emitting elements 102 propagates.

FIG. 6 is a plan view showing how the light emitted from the light-emitting elements 102 propagates. The light emitted from each light-emitting element 102 enters the light guide 103, and after the light is diffused in the light guide 103, the light enters the display panel PNL. The light emitted from the light-emitting elements 102 adjacent to each other is sufficiently mixed together and reach the display portion DA. As a result, stripe-shaped display irregularities caused by difference in luminance are suppressed, and degradation in display quality can be suppressed.

On the other hand, part of the light diffused in the light guide 103 reaches the first surface 103A and the second surface 103B of the light guide 103. For example, in a case where the first surface 103A and the second surface 103B are in contact with an air layer, most of light which reaches the first surface 103A and the second surface 103B is totally internally reflected because the refractive index of the air layer is lower than the refractive index of the light guide 103. However, light which is incident at an angle deviating from total internal reflection conditions is emitted to the outside of the light guide 103 and does not reach the display panel PNL. For example, when the light guide 103 is molded, micro-irregularities such as fins and burrs are formed on the first surface 103A and the second surface 103B in some cases. Since part of light which reaches such an irregularity is made incident at an angle deviating from total internal reflection conditions, the light is emitted to the outside of the light guide 103. Consequently, light which leaks to the outside of the light guide 103 does not contribute to display and leads to degradation in light use efficiency.

In the present embodiment, the reflectors 104 are disposed on the first surface 103A and the second surface 103B, respectively. Therefore, light which reaches the first surface 103A and the second surface 103B is reflected by the reflectors 104. In addition, even if light leaks from the first surface 103A and the second surface 103B to the outside of the light guide 103, the light is reflected by the reflectors 104, reenters the light guide 103, and is emitted to the display panel PNL. Therefore, the degradation in light use efficiency can be suppressed. In addition, a loss of light which reaches the display portion DA is suppressed, and as compared to a case where reflectors are not provided, the luminance can be improved. Alternatively, in a case where substantially the same luminance as a comparative example where reflectors are not provided is realized, as compared to the comparative example, the power consumption can be reduced.

Figure 7:
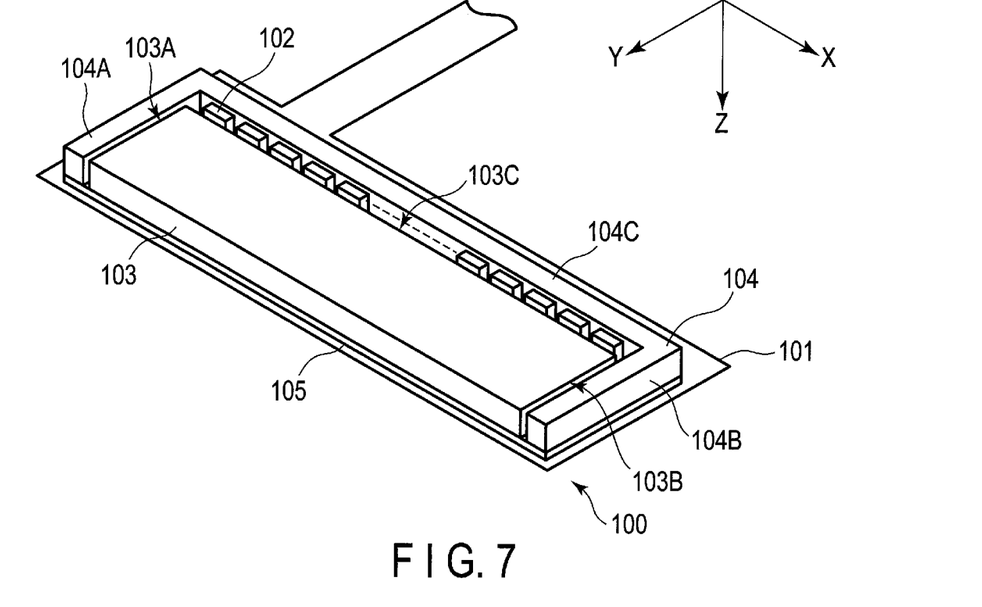
FIG. 7 is a perspective view showing another configuration example of the light-emitting module 100 shown in FIG. 1.

FIG. 7 is a perspective view showing another configuration example of the light-emitting module 100 shown in FIG. 1. The light-emitting module 100 shown in FIG. 7 differs from the light-emitting module 100 shown in FIG. 3 in that the reflector 104 is disposed so as to surround the light-emitting elements 102. That is, the reflector 104 has a first portion 104A which faces the first surface 103A, a second portion 104B which faces the second surface 103B, and a third portion 104C which connects the first portion 104A and the second portion 104B. The light-emitting elements 102 are disposed between the third portion 104C and the light guide 103. The light guide 103 is surrounded by the first portion 104A, the second portion 104B and the third portion 104C.

The light guide 103 and the reflector 104 are bonded to the wiring substrate 101 by the adhesive layer 105. The first portion 104A may be in contact with the first surface 103A or may be separated from the first surface 103A. The second portion 104B may be in contact with the second surface 103B or may be separated from the second surface 103B.

In this configuration example also, the same advantages as those described above can be obtained. In addition, as compared to the above-described configuration example, the number of components can be reduced and the manufacturing process can be simplified. In addition, since the reflector 104 has the third portion 104C located behind the light-emitting elements 102, light reflected by the third surface 103C is reflected by the third portion 104C, and the light use efficiency can be improved.

Figure 8:
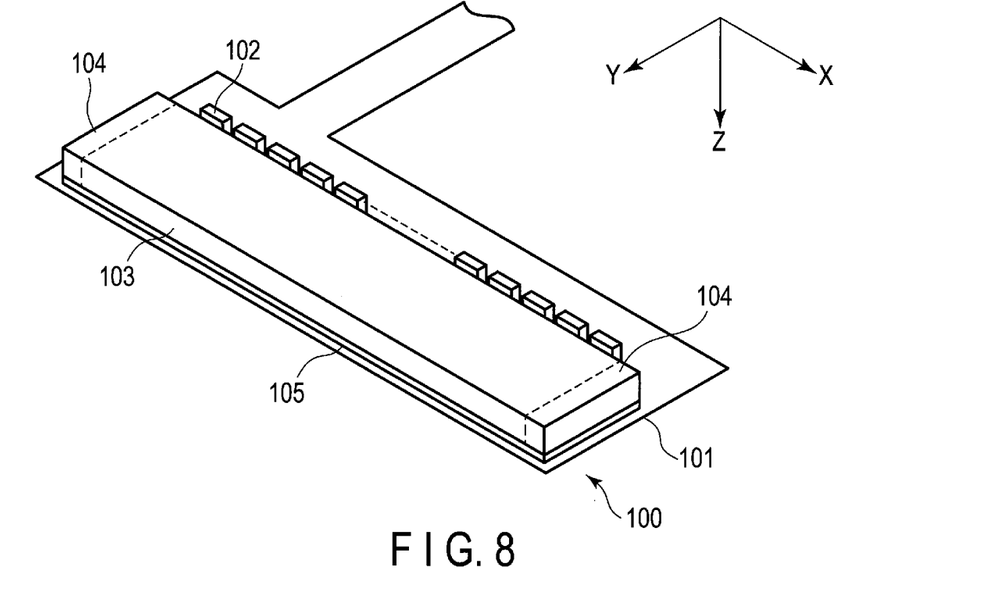
FIG. 8 is a perspective view showing another configuration example of the light-emitting module 100 shown in FIG. 1.

FIG. 8 is a perspective view showing another configuration example of the light-emitting module 100 shown in FIG. 1. The light-emitting module 100 shown in FIG. 8 differs from the light-emitting module 100 shown in FIG. 3 in that the reflector 104 is integrally formed with the light guide 103. The light guide 103 which is integrally formed with the reflector 104 is formed by, for example, coinjection molding of simultaneously injecting a material which is transparent and used for the light guide 103 and a material which is white or the like and used for the reflector 104 into a mold cavity, or other methods.

Also in this configuration example, the same advantages as those described above can be obtained.

Figure 9:
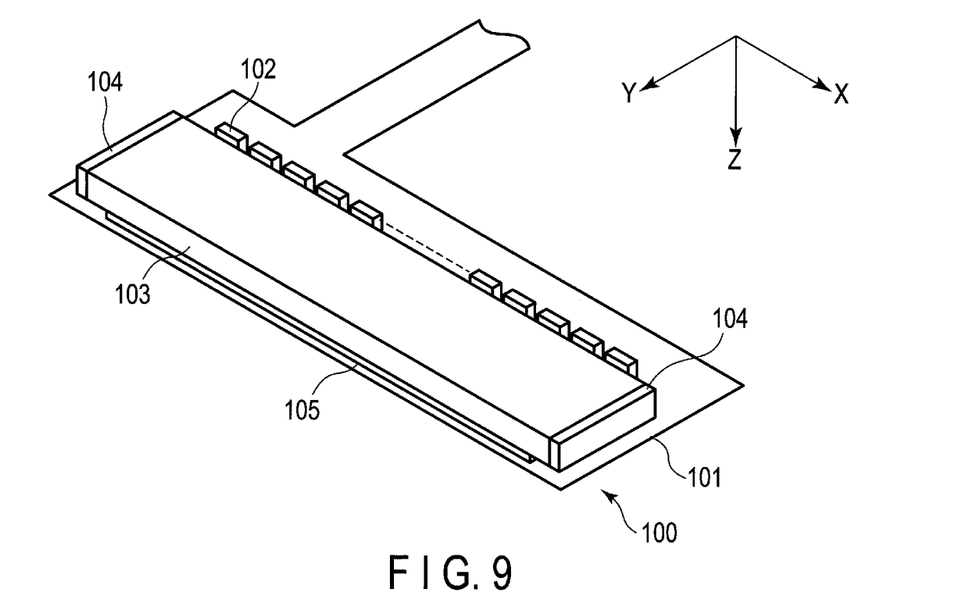
FIG. 9 is a perspective view showing another configuration example of the light-emitting module 100 shown in FIG. 1.

FIG. 9 is a perspective view showing another configuration example of the light-emitting module 100 shown in FIG. 1. The light-emitting module 100 shown in FIG. 9 differs from the light-emitting module 100 shown in FIG. 3 in that the reflector 104 is a film formed on each of the first surface 103A and the second surface 103B. This reflector 104 is formed by, for example, a method of evaporating a light reflective metal material such as silver.

Also in this configuration example, the same advantages as those described above can be obtained.

In the above-described embodiment, a case where the light guide 103 is formed into a flat plate has been described. However, the invention is not limited to this case. For example, the light guide 103 may have a curved surface with respect to the side surface E21 of the display panel PNL. In a case where the light guide 103 has this curved surface, the light guide 103 has the fourth surface 103D which is a curved surface facing the side surface E21 of the display panel PNL, the third surface 103C which is a curved surface facing the light-emitting elements 102, and the first surface 103A and the second surface 103B which are flat surfaces connecting the third surface 103C and the fourth surface 103D, and the reflector 104 is disposed on each of the first surface 103A and the second surface 103B.

As described above, according to the present embodiment, a display device, a light-emitting module and an electronic component which can suppress degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel comprising a first substrate, a second substrate including a glass substrate, and a polymer dispersed liquid crystal layer held between the first substrate and the second substrate; and
a light-emitting module disposed on the first substrate and facing along a side surface of the glass substrate, wherein
the light-emitting module comprises:
a light-emitting element;
a light guide disposed between the light-emitting element and the side surface;
a wiring substrate electrically connected to the light-emitting element; and
a reflector bonded to the wiring substrate,
the light guide has a first surface and a second surface facing each other in a first direction, a third surface facing the light-emitting element, a fourth surface facing the side surface, a fifth surface bonded to the wiring substrate and a sixth surface bonded to the first substrate,
the third surface and the fourth surface face each other in a second direction intersecting the first direction,
the fifth surface and the sixth surface face each other in a third direction,
the third direction corresponds to a thickness direction of the display panel,
the reflector faces each of the first surface and the second surface in the first direction, and
the reflector is separated from each of the first surface and the second surface with spaces in the first direction.

2. The display device of claim 1, wherein the reflector is formed of a white material.

3. The display device of claim 1, wherein the reflector is formed of a metal material.

4. The display device of claim 1, wherein the light-emitting module further comprises a common adhesive layer, wherein
the reflector and the fifth surface of the light guide are bonded to the wiring substrate by the common adhesive layer.

5. The display device of claim 4, wherein
the reflector has a first portion facing the first surface, a second portion facing the second surface, and a third portion connecting the first portion and the second portion, and
the light-emitting element is disposed between the third portion and the light guide, in the second direction.

6. A light-emitting module comprising:
a light-emitting element;
a wiring substrate electrically connected to the light-emitting element;
a light guide having a first surface and a second surface facing each other in a first direction, and a third surface facing the light-emitting element in a second direction intersecting the first direction; and
a reflector disposed on the wiring substrate and facing each of the first surface and the second surface in the first direction, wherein
the reflector is separated from each of the first surface and the second surface with spaces in the first direction.

7. The light-emitting module of claim 6, further comprising:
a common adhesive layer, wherein
the reflector and the light guide are bonded to the wiring substrate by the common adhesive layer.

8. The light-emitting module of claim 6, wherein
the reflector has a first portion facing the first surface, a second portion facing the second surface, and a third portion connecting the first portion and the second portion, and
the light-emitting element is disposed between the third portion and the light guide in the second direction.

9. The light-emitting module of claim 6, wherein
the light guide further has a fifth surface bonded to the wiring substrate,
each of an area of the first surface and an area of the second surface is smaller than an area of the third surface, and
an area of the fifth surface is larger than an area of the third surface.

10. The display device of claim 1, wherein the first substrate further comprises an IC chip,
the light-emitting element and the light guide are disposed between the IC chip and the glass substrate in the second direction.

11. The display device of claim 1, wherein the light-emitting module further comprises a plurality of light-emitting elements including the light-emitting element,
the light-emitting elements are arranged at intervals in the first direction, and
the third surface faces the light-emitting elements in the second direction.

* * * * *